United States Patent
Romero

Patent Number: 5,983,996
Date of Patent: Nov. 16, 1999

[54] STEAM CONDENSER

[76] Inventor: Elmer Romero, 135 So. Cherrywood St., West Covina, Calif. 91791

[21] Appl. No.: 09/153,572

[22] Filed: Sep. 15, 1998

[51] Int. Cl.[6] .................................................. F28B 3/00
[52] U.S. Cl. .......................... 165/111; 165/118; 165/114
[58] Field of Search ................................ 165/111, 114, 165/112, 118, 142

[56] References Cited

U.S. PATENT DOCUMENTS

| | | | |
|---|---|---|---|
| 93,424 | 8/1869 | Dingee | 165/118 |
| 97,405 | 11/1869 | Hughes | 165/118 |
| 838,314 | 12/1906 | Fricke | 165/118 |
| 946,238 | 1/1910 | Loomis | 165/114 |
| 1,526,902 | 2/1925 | Christman | 165/114 |
| 1,621,268 | 3/1927 | Penniman, Jr. | 165/114 |
| 1,637,558 | 8/1927 | Doyle | 165/114 |
| 1,960,770 | 5/1934 | Brown | 165/114 |
| 2,498,752 | 2/1950 | Copeland | 165/118 |
| 4,564,064 | 1/1986 | Allo et al. | 165/142 |
| 5,004,043 | 4/1991 | Mucic et al. | 165/118 |
| 5,172,760 | 12/1992 | Hedrick | 165/114 |

*Primary Examiner*—Ira S. Lazarus
*Assistant Examiner*—Terrell McKinnon
*Attorney, Agent, or Firm*—Boniard I. Brown

[57] ABSTRACT

A steam condenser has a perforated plate extending transversely in a housing, a pipe extending upwardly from an opening in the plate and having openings in its upper portion, at least one steam inlet, and a deflector adjacent to said inlet extending inwardly of the housing and downwardly to deflect and disburse steam to enhance condensation.

7 Claims, 1 Drawing Sheet

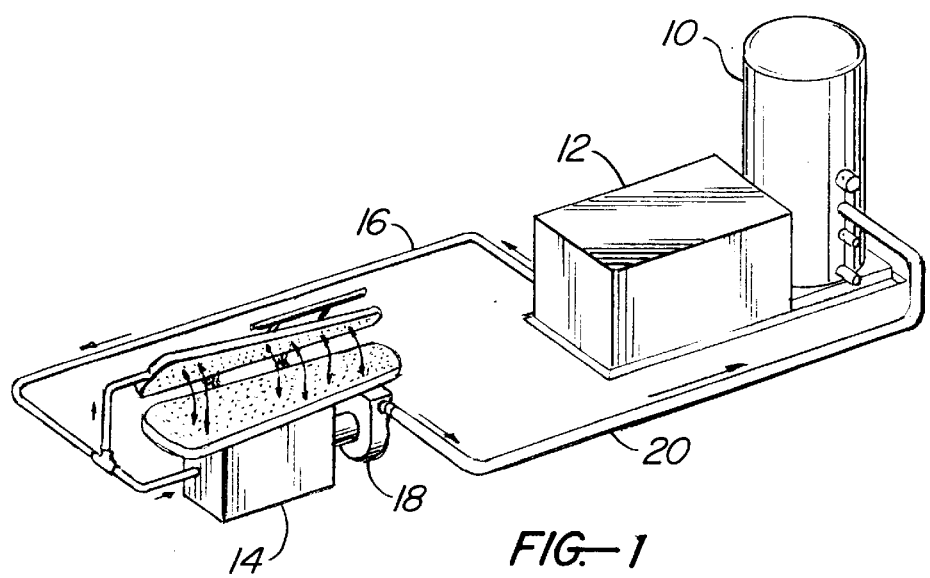
FIG.-1
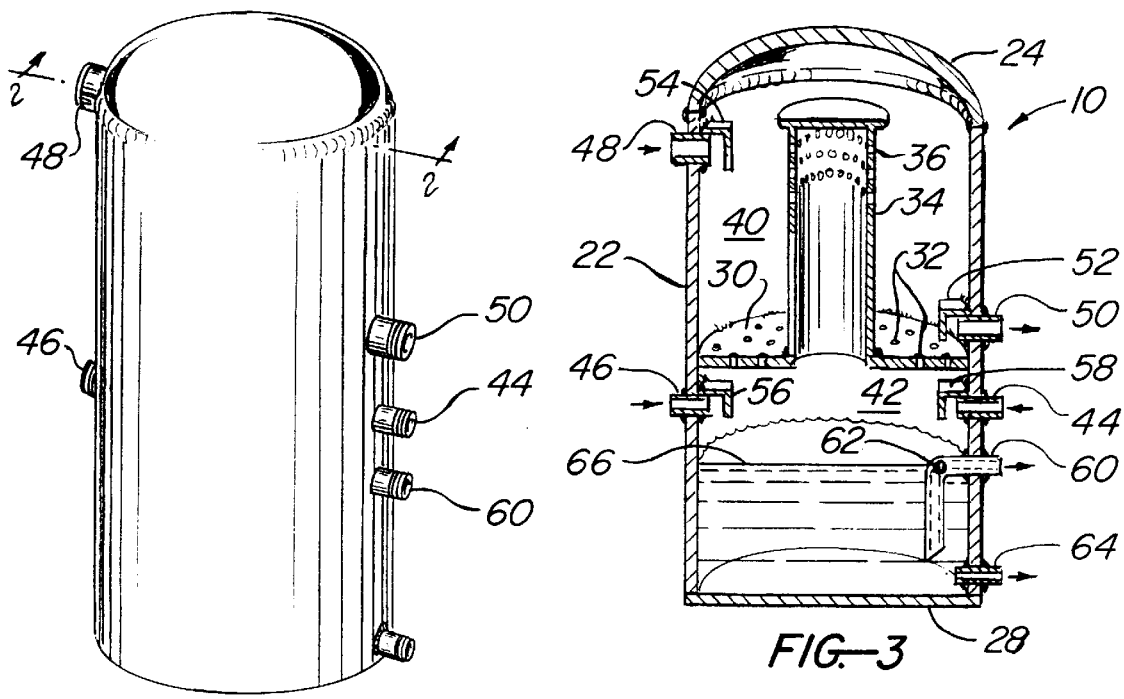
FIG.-2
FIG.-3

STEAM CONDENSER

BACKGROUND AND SUMMARY OF THE INVENTION

In the utilization of steam, as provided by boilers, steam and air from apparatus utilizing the steam is conventionally disposed of by passing it to atmosphere or by condensing it and passing condensate to drain.

In many applications or locations, steam and moisture-bearing air cannot reasonably or appropriately be disposed by passing to atmosphere. Examples of such applications are utilization of steam in retail establishments and shopping malls, as for the pressing of clothing items in retail clothing sales or repair establishments. In such locations, steam presses or press boards are utilized to press clothing items being fabricated, altered or repaired for customers. In many locations, such as shopping malls, the exhausting of steam or moisture-bearing air to atmosphere requires a conduit passing upwardly through a building structure, perhaps two or more stories, and through a roof to vent, thus involving expensive construction, piping, etc. Tn such applications, it is necessary or appropriate to provide means for the condensing of steam and hot moisturized air and the disposal of the same via drains and sewage systems.

Condensers or "blow down" tanks have long been utilized for such purposes.

The present invention provides improved condensers for the condensing and disposal of steam and hot, moisturized air in such applications, the improved condenser comprises a housing with a plate extending transversely therein defining a plurality of perforations therein, a pipe mounted at an opening in the plate and extending upwardly with a closed upper end, and at least, one inlet tube in the wall of the housing for emitting steam, and a deflector mounted adjacent the at least one inlet tube to extend inwardly and downwardly to deflect and disburse steam, said at least one inlet tube being below said plate.

BRIEF DESCRIPTION OF THE DRAWINGS

FIG. 1 is a perspective view of a condenser of the invention in association with a boiler and pressing apparatus utilizing steam;

FIG. 2 is a perspective view of the exterior of a condenser of the invention; and FIG. 3 is a sectional perspective view taken at line 2—2 in FIG. 2.

DESCRIPTION OF THE PREFERRED EMBODIMENT

Referring to the drawing, FIG. 1 shows an assembly comprising a steam condenser 10 according to the invention, a boiler 12, a press table 14 connected to the boiler by a conduit line 16, and a vacuum pump 18 connected to the condenser by a line 20.

The condenser according to the invention is shown in FIGS. 2 and 3, as comprising a cylindrical outer shell or wall 22, a dome-shaped head or dome 24 welded to the upper end or edge of the shell, has a generally flat bottom or wall 28 secured, as by welding, to the lower edge of the shell. A plate 30 is secured, as by welding, to the inner wall of shell. 22 transversely of the axis of the shell, and separates the condenser interior into an upper chamber 40 and a lower chamber 42. A plurality of openings 32 is defined in the plate, and a pipe 34 of substantial cross-section is secured, as by welding, axially of shell 22 in a central opening in the plate. The pipe has a plurality of openings defined in its upper portion, and a cap closing its upper end, as shown.

A steam inlet tube 44 is secured by welding in an opening 20 in the shell below plate 30, and another inlet member 46 is secured by welding in an opening in the shell opposite from inlet member 44. A third inlet tube 48 is secured, as by welding, in an upper portion of the shell, and a vapor outlet tube 50 is secured in an opening in the shell a short distance above plate 30.

Deflectors 52, 54, 56 and 58, each having an inwardly extending portion and a transversely extending portion, are secured to the shell adjacent, respectively, tubes 50, 48, 46 and 44, as shown. An alternate form of deflector transverse portion of the deflector extends upwardly from an inwardly extending portion of the deflector.

A bent elbow pipe 60 is secured, as by welding, in an opening below inlet. 44, and extends inwardly and downwardly, as shown, and has an opening 62 at the bent portion of pipe. A drain tube 64 is secured in an opening near the bottom of shell 22 for draining of water 66 from the condenser, when appropriate.

In the operation of the apparatus of the invention, steam and moisture enter inlet 44 via conduit 20 from a suction-blower 18 which draws steam and moisture from the steam press 14, which steam has passed through items being pressed and then is drawn from the steam press by the suction-blower 18, and passes into the condenser via conduit 44. If appropriate in particular situations, steam, moisture and condensate may also enter inlet 48 via another conduit (not shown). Inlet 46 provides input for condensate return, when this is useful or desired. Outlet 50 provides egress for condensate, air, to atmosphere, and may be utilized in appropriate operations.

Steam and moisture passing through the inlets or outlets is deflected by the deflectors shown, thus to provide improved condensing and cooling action. Steam and moisture entering inlet 44 encounters reflector 58 and is deflected and dispersed in lower chamber 42 and to the water 66 in the lower portion of the condenser. Steam, condensate or air entering or leaving the other inlets or outlets is similarly deflected and dispersed by the deflectors, thus to spread the same, disperse energy, and provide improved condensing action.

Steam, moisture and air pass upwardly through pipe 34 and outwardly through opening 36 therein into upper chamber 40, and is dispersed in the upper chamber, thereby providing enhanced condensing action. Water droplets fall onto plate 30 and through the openings 32 therein, and thence to the cooling water 66 below.

Holes 36 assist in pressurizing the lower chamber 42, thus to aid steam condensation.

The water 66 in the lower portion of the condenser, having a relatively lower temperature than the steam or condensate, assists in the condensing of steam because of its lower temperature, particularly when the water has set overnight, between days of operation of the condenser, without being subjected to heat.

The bent elbow pipe 60 passes relatively cool water from the lower portion of the body of water 66 outwardly to drain (not shown). The opening 62 at the elbow of pipe 60 prevents any partial vacuum or bubble which would tend to impede water flow, and serves to provide a desired water level in the condenser by draining water above the level of the opening.

Thus there has been shown and described a boiler condenser assembly which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A steam condenser comprising:
   a housing,
   a plate extending transversely in the housing and defining a plurality of perforations therein,
   a pipe connected at an opening in the plate to extend upwardly in the housing, the pipe having a closed upper end, with a plurality of openings formed around said pipe upper end,
   at least one inlet tube in a wall of the housing for admitting steam, and
   an outlet for passing condensate from the housing.

2. A condenser according to claim 1, and further including:
   a deflector mounted adjacent to said inlet tube and extending inwardly of the shell and downwardly to deflect and spread steam to facilitate condensation.

3. A condenser according to claim 1, and further including:
   at least one outlet tube in the housing wall, and
   a deflector adjacent to each said inlet and outlet tube and extending inwardly of the shell and downwardly to deflect steam and condensate.

4. A condenser according to claim 1, wherein:
   the plate is secured bi welding to an interior wall of the housing,
   said inlet tube extends through the housing wall below said plate, and
   said plate defines upper and lower chambers in the housing.

5. A condenser according to claim 1, wherein:
   said housing comprises an outer shell and a dome secured atop the shell,
   said pipe extends from a central opening in the plate, and
   a cap is secured about the upper periphery of the pipe.

6. A condenser according to claim 1, and further including:
   an outlet pipe for outflow of water to maintain a predetermined water level in a lower portion of the housing, and
   a drain opening adjacent the bottom of the housing for drainage.

7. A condenser according to claim 6, wherein:
   said outlet pipe has a bend therein defining a portion extending outwardly through the housing wall and a connecting portion extending downwardly into water at a bottom portion of the housing, and
   said pipe having an opening at said bend for flow of water outwardly through the housing wall and for maintaining the water level at the level of said opening.

* * * * *